W. G. TARRANT AND W. H. BARLING.
LANDING SKID FOR AEROPLANES OR SIMILAR AIRCRAFT.
APPLICATION FILED MAR. 27, 1919.
1,309,227.
Patented July 8, 1919.
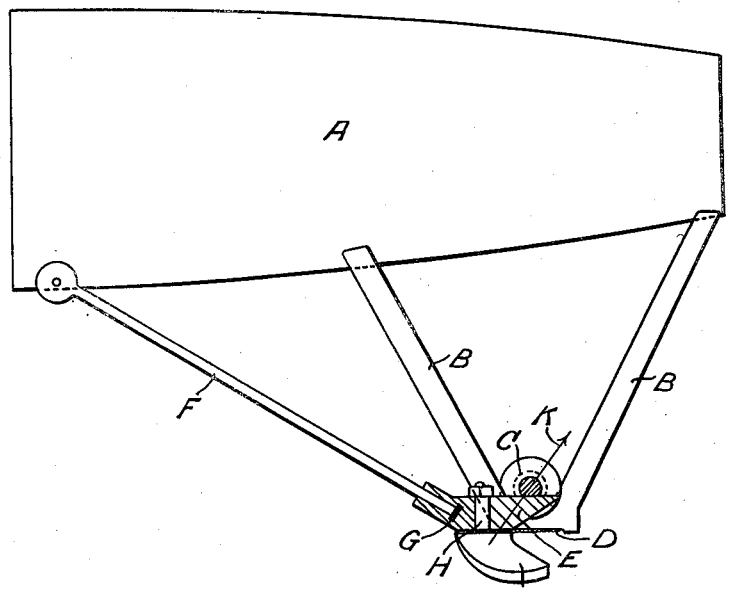
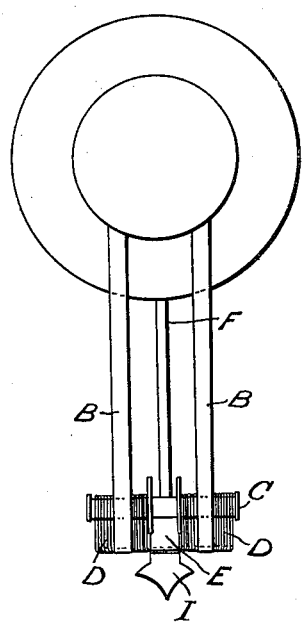

UNITED STATES PATENT OFFICE.

WALTER GEORGE TARRANT AND WALTER HENRY BARLING, OF BYFLEET, ENGLAND.

LANDING-SKID FOR AEROPLANES OR SIMILAR AIRCRAFT.

1,309,227.        Specification of Letters Patent.      Patented July 8, 1919.

Application filed March 27, 1919. Serial No. 285,627.

*To all whom it may concern:*

Be it known that we, WALTER GEORGE TARRANT and WALTER HENRY BARLING, subjects of the King of Great Britain, residing, respectively, at Lake House, Byfleet, in the county of Surrey, England, and "Cabar," Petersham Avenue, Byfleet, in the county of Surrey, England, have invented new and useful Improvements in Landing-Skids for Aeroplanes or Similar Aircraft, of which the following is a specification.

This invention relates to improvements in landing skids for aeroplanes and the like.

According to this invention we so mount in brackets depending from the fuselage an axle which can rise therein against the action of a spring or springs, and on the axle we mount a block carrying a shoe which can turn about a vertical axis, and we connect the block by a rod to a pivot on the fuselage.

Our invention is illustrated by the accompanying drawings, Figure 1 of which is a side view partly in section and Fig. 2 a rear view.

A is a portion of the fuselage of an aeroplane and B, B, are V struts secured thereto, one on each side of the center line of the fuselage. C is an axle supported by the V struts and connected to them by elastic D wound over the axle and under the struts on both sides. In place of the elastic we may employ springs placed inside the struts. On the axle C is mounted a block E which is connected to a point on the fuselage in front of the struts by a rod F, the lower end of which enters a socket G in the block E and is left free to turn therein, so that the rod cannot experience torsional stresses. In the block is fitted a vertical bolt or pin H which carries a skid I which is thus free to turn relatively to the block E, so that it can adjust itself and allow the machine to turn freely on the ground. The skid is formed with a double curve as shown, so that it can dig into the ground to a limited extent, the shape of the curve being such that the resultant pressure of the ground always passes through the axis of the axle C as indicated by the arrow K.

It will be seen that the skid may be easily removed and replaced when worn.

What we claim is:—

1. In landing skids for aircraft, the combination of a spring mounted axle, a block capable of rotation about the axis thereof, and a shoe carried by the block and capable of movement about a vertical axis.

2. In an aircraft, the combination of a fuselage, brackets depending therefrom, an axle in the brackets, springs connecting the axle to the brackets, a block capable of rotation about the axis of the axle, a shoe carried by the block and capable of movement about a vertical axis and a rod pivoted to the fuselage and connected to the block.

3. In an aircraft, the combination of a fuselage, brackets depending therefrom, an axle in the brackets, springs connecting the axle to the brackets, a block capable of rotation about the axis of the axle, a shoe carried by the block and capable of movement about a vertical axis and a rod pivoted to the fuselage, connected to the block and free to turn relatively to the block.

In testimony that we claim the foregoing as our invention we have signed our names this 21st day of February, 1919.

WALTER GEORGE TARRANT.
WALTER HENRY BARLING.